(12) United States Patent
Bhattacharjee

(10) Patent No.: US 11,991,060 B2
(45) Date of Patent: May 21, 2024

(54) SYSTEM AND METHODS FOR PROVIDING REAL-TIME NETWORK TELEMETRY DATA

(71) Applicant: Charter Communications Operating, LLC, St. Louis, MO (US)

(72) Inventor: Kaushik Bhattacharjee, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 75 days.

(21) Appl. No.: 17/847,331

(22) Filed: Jun. 23, 2022

(65) Prior Publication Data

US 2023/0421469 A1 Dec. 28, 2023

(51) Int. Cl.
*H04L 43/08* (2022.01)
*H04L 41/5061* (2022.01)
*H04L 43/04* (2022.01)

(52) U.S. Cl.
CPC .......... *H04L 43/08* (2013.01); *H04L 41/5061* (2013.01); *H04L 43/04* (2013.01)

(58) Field of Classification Search
CPC ...... H04L 41/5061; H04L 43/08; H04L 43/04
See application file for complete search history.

(56) References Cited

U.S. PATENT DOCUMENTS

| 8,473,325 B2 | 6/2013 | Barnhill, Jr. et al. | |
| 2007/0047701 A1* | 3/2007 | Morris | G06F 9/54 379/100.08 |
| 2010/0138370 A1* | 6/2010 | Wu | H04H 60/33 707/769 |
| 2010/0191619 A1* | 7/2010 | Dicker | G06Q 30/0603 705/26.1 |
| 2017/0244657 A1* | 8/2017 | Baldwin | H04L 51/212 |
| 2018/0276266 A1* | 9/2018 | Diwakar | G06F 16/24578 |
| 2019/0076741 A1* | 3/2019 | Thompson | H04N 21/21805 |
| 2021/0067903 A1* | 3/2021 | Rothschild | H04B 17/318 |
| 2021/0133245 A1* | 5/2021 | Reehil | H04L 41/342 |
| 2022/0058042 A1* | 2/2022 | Vanjare | G06F 9/45558 |
| 2023/0031872 A1* | 2/2023 | Bewley | G06F 16/188 |

* cited by examiner

Primary Examiner — Lesa M Kennedy
(74) Attorney, Agent, or Firm — Young Basile Hanlon & MacFarlane, P.C.

(57) ABSTRACT

A system and method for providing real-time router telemetry data to a customer. The system includes a response cache and a processor. The processor pulls, in response to a request from a management application, telemetry data from a device for all features identified for a customer starting an active session on the management application. The processor sends the telemetry data to the management application for display, stores the telemetry data in the response cache, and initiates a subscription process for each identified feature. Each subscription process listens for changes in telemetry data for an associated identified feature and pushes detected changes in the telemetry data to the response cache. The processor sends, in response to a request from the management application for a customer selected identified feature, real-time updates to telemetry data associated with the customer selected identified feature from the response cache to the management application.

20 Claims, 6 Drawing Sheets

SYSTEM AND METHODS FOR PROVIDING REAL-TIME NETWORK TELEMETRY DATA

TECHNICAL FIELD

This disclosure relates to network telemetry data available at customer premises equipment. More specifically, this disclosure relates to efficiently and intelligently providing real-time network telemetry data to users.

BACKGROUND

Service providers or operators provide data, voice, video, Internet, and other services to users, customers, and/or subscribers (collectively "customers"). Customer premises equipment (CPE), such as routers, are network devices which enable bidirectional traffic between a service provider system and a customer's premises via a cable network. A variety of devices can connect to the router, including but not limited to, mobile devices, desktops, and smart appliances. The customer, via logging into a mobile device application or platform, can manage the CPE and receive network telemetry data and topology information with respect to the CPE. When the customer logs in, a client on a customer device can obtain network events, such device connection and disconnection, via a server at the service provider system. Updated network event information can be obtained by refreshing an access page. That is, a new set of data is obtained by the client via the server. This can be expensive in terms of cost and resources. For example, if the customer's premise has 60-100 devices connected to the router, the level of traffic flow can result in slowed network response times and other issues.

Customer experience is proportional to the speed and reliability of the Wi-Fi® connection. Customer experience also depends on how fast these network events can be relayed to the customer via the mobile device application or platform. Polling mechanisms may be employed by some techniques to keep the customer updated. However, these polling mechanisms can create a chatty and expensive workflow between the client on the customer device and the server at the service provider. In addition, these polling mechanisms can be difficult to manage. Moreover, as network changes can be continually occurring, polling mechanisms do not always provide the right state and/or status of the router and associated network since the polling occurs at predefined intervals.

SUMMARY

Disclosed herein are methods, apparatus, and systems for providing real-time network telemetry data to customers. In implementations, a system for real-time network telemetry data includes a response cache and a processor connected to the response cache. The processor pulls, in response to a request from a management application on a customer device, network telemetry data from a network device for at least one feature identified for a customer starting an active session on the management application. The management application being associated with the network device. The processor sends the network telemetry data to the management application for display on the customer device, stores the network telemetry data in the response cache, and initiates a subscription process for each identified feature. Each subscription process listens for changes in network telemetry data for an associated identified feature and pushes detected changes in the network telemetry data for the associated identified feature to the response cache. The processor sends, in response to a request from the management application for a customer selected identified feature, real-time updates to network telemetry data associated with the customer selected identified feature from the response cache to the management application.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
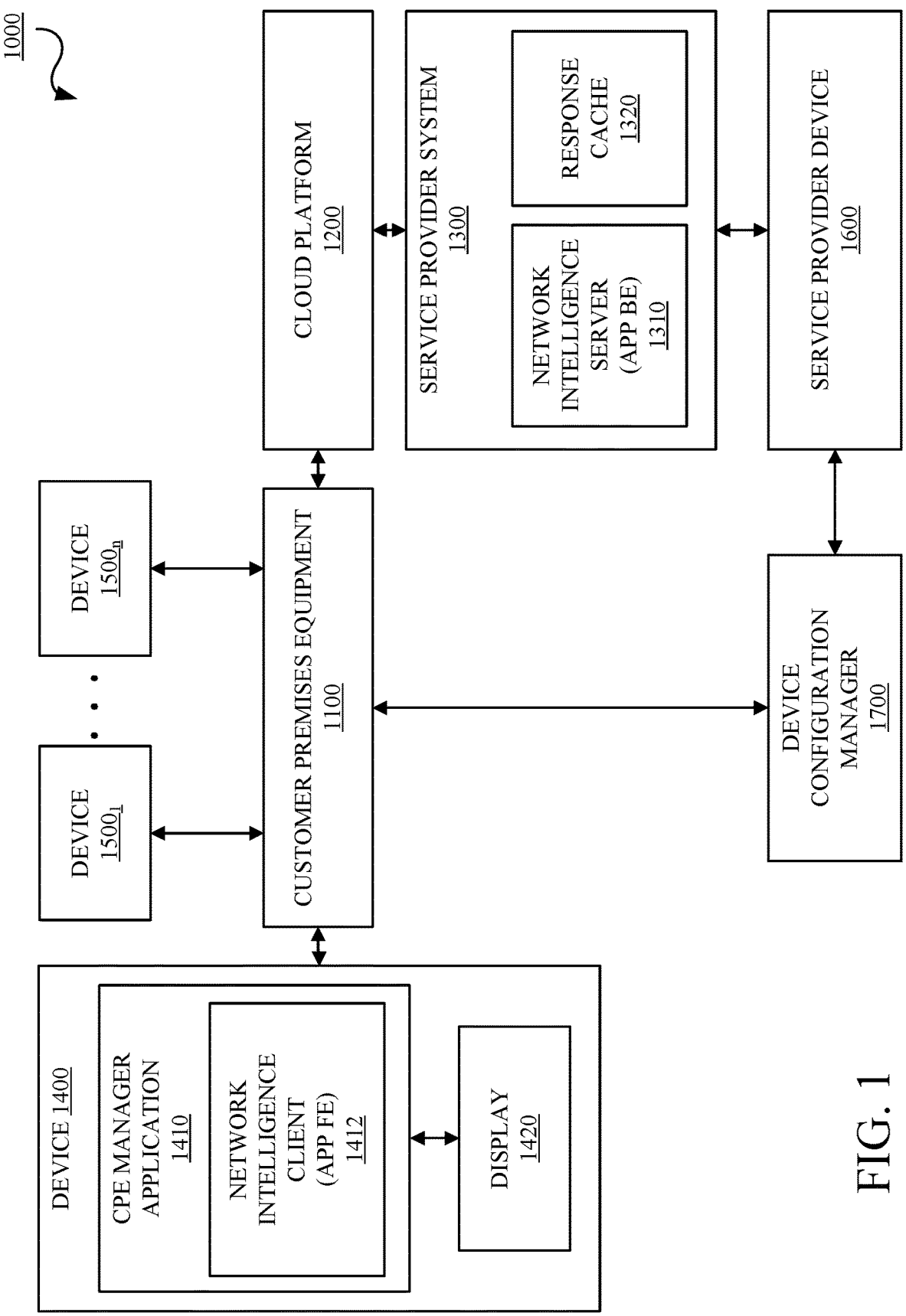
FIG. 1 is a diagram of an example real-time network telemetry data reporting architecture in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device", or "cloud computing system" includes any unit, or combination of units, capable of performing any method, or any portion or portions thereof, disclosed herein. For example, the "server", "computer", "computing device", or "cloud computing system" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, apparatus, and systems for providing real-time network telemetry data to customers. An intelligent, scalable, and cost effective system can provide real-time network telemetry data to a customer via a smart application provisioned on a customer device and/or via a Web-based or online platform. The system enables the customer to obtain real-time updates from the router for certain network events.

In some implementations, the system can use a client-server based application and a response cache to obtain and provide the real-time network telemetry data to the customer. The customer can create a profile and subscribe to interested feature(s). Different users can have different profiles. The subscription process can initiate listeners or listening agents for each of the features and pull data from the router when a change in the data occurs. The changed data can be saved in the response cache. The server-side system can then push the changed data to the client. The client, in turn can cause the changed data to be displayed to the customer in real-time. This minimizes the amount of data that has to be pulled from the router. This decreases the latency between the data change event and the reporting of the data change event to the customer. The customer can get real-time visibility of network changes related to the feature(s) when the customer is active in the application. Accordingly, the customer can manage the connected experience.

In some implementations, machine learning techniques can be used to learn customer login times, preferences, features, and other characteristic data to generate and provide real-time network telemetry data insights.

In some implementations, the system can provide a customer, on-demand, real-time notification and insight on their home network system and other advanced network and security features such as, but not limited to, security, privacy, and parental control states. The advanced home network customer can choose features of interest, and accordingly, a cloud-based back end can adjust and optimize workflows to lower the cost in terms of both network, features, and resources. In these implementations, the system enables a customer with feature selection or parameter configuration to optimize the workflow.

In some implementations, a service provider personnel can access versions of the response cache to troubleshoot issues with the router and associated network.

FIG. 1 is a diagram of an example real-time network telemetry data reporting architecture or system 1000 in accordance with some embodiments of this disclosure. In an implementation, the architecture 1000 can include a customer premises equipment (CPE) 1100 connected to or in communication with (collectively "connected to") a cloud platform 1200, which in turn is connected to a service provider system 1300. A device 1400 and devices $1500_1$ to $1500_N$ can be connected to the CPE 1100. In some implementations, a service provider device 1600 can be connected to the service provider system 1300 and to a device configuration manager 1700, which in turn is connected to the CPE 1100. The CPE 1100, the cloud platform 1200, the service provider system 1300, the device 1400, the devices $1500_1$ to $1500_N$, the service provider device 1600, and the device configuration manager 1700 can be connected using one or more of pseudo-wire, wired, wireless, the Internet, an intranet, a low power wide area network (LPWAN), a local area network (LAN), a wide area network (WAN), a public network, a private network, a cellular network, a Wi-Fi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The architecture 1000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein. Each of the components described in the architecture 1000 can include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The CPE 1100 can be a cable modem, an Embedded Multimedia Terminal Adapter (eMTA), an optical network unit (ONU) device, a gateway, a router, a set-top box, and the like which provides connectivity including Internet connectivity, wired connectivity, wireless connectivity, data, voice over IP, and combinations thereof to the device 1400 and the devices $1500_1$ to $1500_N$. The CPE 1100 can be referred to as a network device.

Figure 2:
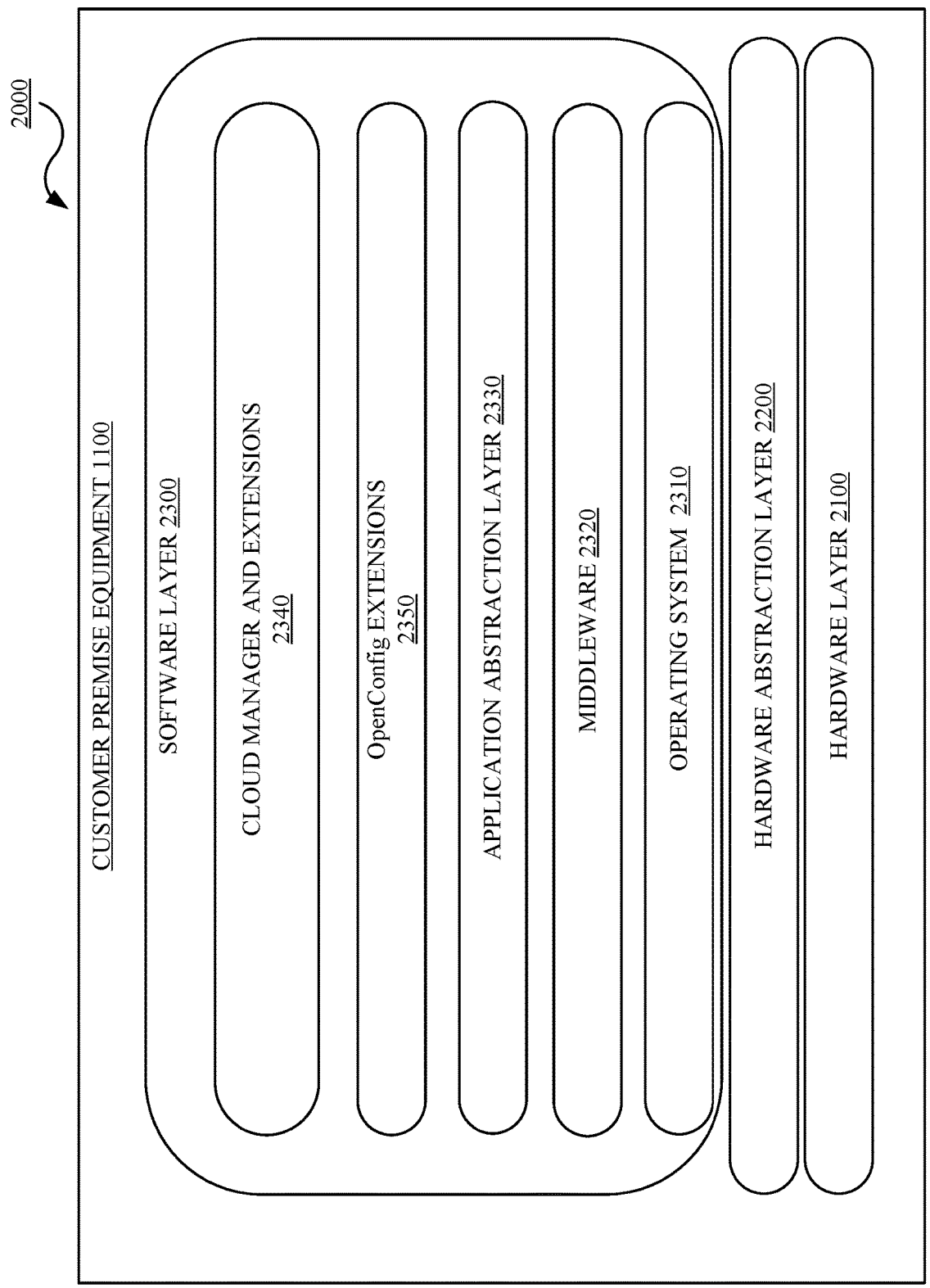
FIG. 2 is a block diagram of an example customer premises equipment's stack architecture in accordance with embodiments of this disclosure.

The CPE 1100 can implement a stack architecture 2000 as shown in FIG. 2. The stack architecture 2000 can include a hardware layer 2100, a Hardware Abstraction Layer (HAL) 2200, and a software layer 2300 which collectively collects and streams network telemetry data to the service provider system 1300. The HAL 2200 provides the Application Programming Interfaces (APIs) between hardware drivers in the hardware layer 2100 and the various software components in the software layer 2300. The software layer 2300 includes an open-source and/or modular cloud operating system (OS) 2310 integrated with a middleware layer 2320, an application abstraction layer 2330, a cloud manager and extensions 2340, and an OpenConfig based extensions 2350. The stack architecture 2000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The cloud platform 1200 can provide cloud-based open-source, modular, third party and/or service provider provided management and connectivity services for the CPE 1100 and as between the CPE 1100 and the service provider system 1300.

Figure 4:
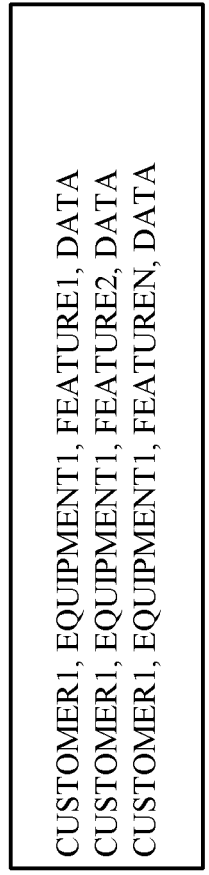
FIG. 4 is a diagram of example real-time network telemetry data in accordance with embodiments of this disclosure.
Figure 5:
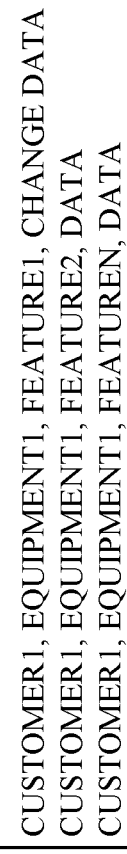
FIG. 5 is a diagram of example real-time network telemetry data with a data change in accordance with embodiments of this disclosure.

The service provider system 1300 can collect network telemetry data from the CPE 1100. The service provider system 1300 can include a network intelligence server or backend processor 1310 and a response cache 1320. The network intelligence server or backend processor 1310 can coordinate processing of requests and feature identification and selection from the device 1400 and collection of real-time network telemetry data from the CPE 1100. The response cache 1320 can store the features and associated real-time network telemetry data. In some implementations, the response cache 1320 can be a database stored in memory. In some implementations, the features and associated real-time network telemetry data can be stored in a format as shown in FIG. 4. Changes in the network telemetry data can be saved as versions, in a change data format, and/or using other well-known techniques. Changed network telemetry data can be stored as shown in FIG. 5, where only changed data is stored.

The device 1400 can be, but is not limited to, end user devices, cellular telephones, Internet Protocol (IP) devices, mobile devices, mobile computers, laptops, handheld computers, personal media devices, smartphones, notebooks, notepads, desktops, servers, and the like which are capable, configured, and/or provisioned for operation with or in the network architecture 1000. The device 1400 can be provisioned with a CPE manager application 1410 and include a display 1420. The CPE manager application 1410 can include or implement a network intelligence client or frontend processor 1412 which coordinates with the network intelligence server or backend processor 1310 in a client-server relationship. The network intelligence client 1412 can send the real-time network telemetry data of the CPE 1100 to the display 1420 for presentation. The network intelligence client 1412 can present, via the display 1420, a list of devices connected to the CPE 1100, such as the devices $1500_1$ to $1500_N$, and present features available for each of the devices. The features can include, but are not limited to, security, privacy, parental controls, connectivity state or status, malware detection, and/or like items. The presented devices and features can be based on a customer profile. The presented devices and features can be selected or adjusted by the customer.

The devices $1500_1$ to $1500_N$ can be, but is not limited to, Internet of Thing (IoT) devices, end user devices, cellular telephones, Internet Protocol (IP) devices, mobile computers, laptops, handheld computers, personal media devices, smartphones, notebooks, notepads, servers, and the like which are capable, configured, and/or provisioned for operation with or in the network architecture 1000.

The service provider device 1600 can be, for example, a device such as the device 1400 which can be used by service provider personnel to troubleshoot the CPE 1100. The service provider device 1600 can access the CPE 1100 and the response cache 1320 to analyze network telemetry data.

The device configuration manager 1700 can be used by the service provider device 1600 to update configuration of the CPE 1100 as requested by the service provider device 1600.

Figure 3:
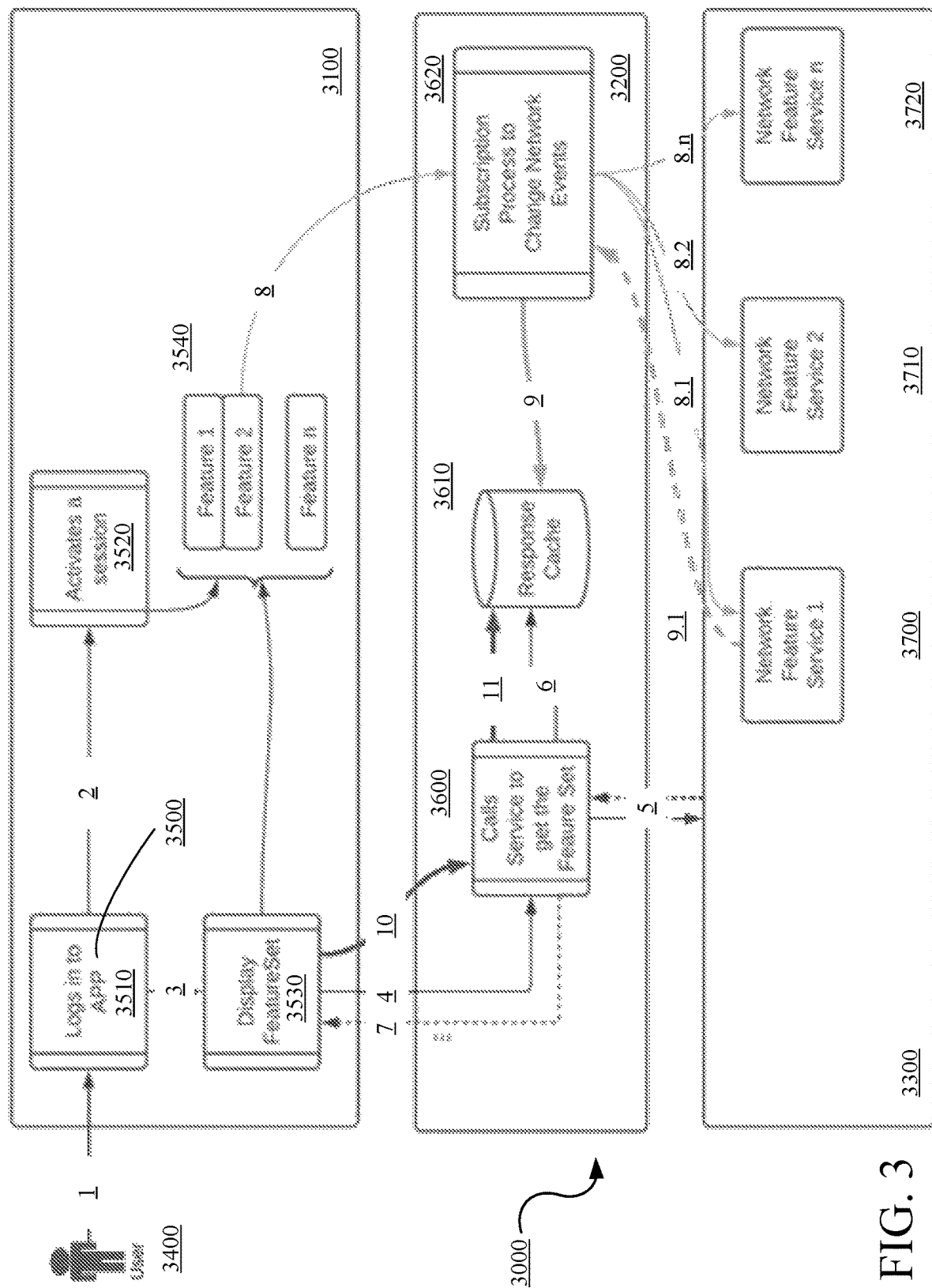
FIG. 3 is a flow diagram of example real-time network telemetry data reporting in accordance with embodiments of this disclosure.

FIG. 3 is a flow diagram 3000 of example real-time network telemetry data reporting in accordance with embodiments of this disclosure. The flow diagram 3000 can be implemented, for example, in the network architecture 1000 of FIG. 1 and using the components described therein. The flow diagram 3000 is described with respect to frontend processing 3100 via a client, backend processing 3200 via a server, and a network device 3300. For example, the client 3100 can be the network intelligence client 1412 of FIG. 1, the server 3200 can be the network intelligence server 1310 of FIG. 1, and the network device 3300 can be the CPE 1100 of FIG. 1. The frontend processing 3100 can handle processing interactive with a customer or user 3400. The backend processing 3200 is associated with processing in support of the frontend processing 3100.

Initially, the customer 3400 can register with a management application 3500 associated with the network device 3300. For example, the management application 3500 can be the CPE manager application 1410 of FIG. 1. The management application 3500 can create an identity or profile for the customer 3400. The management application 3500 can track customer behavior with respect to use of the management application 3500 to populate the profile. For example, the profile can include which devices and which feature(s) for each device are of interest to the customer 3400. In some implementations, machine learning techniques can be used to populate the profile.

In the example flow diagram 3000, a customer or user 3400 can login into a management application 3500 associated with the network device 3300 using login credentials (1). Logging into the management application 3500 can establish an active session 3510 for the customer 3400 (2). The customer 3400 can navigate to or open a page 3520 displaying connected devices and features 3540 available or identified for each device (3) (collectively shown as Feature 1, Feature 2, ..., Feature n in FIG. 3). In some implementations, the devices and features displayed can be based on the profile of the customer 3400. In some implementations, the customer 3400 can modify or select the devices and features 3540 for each device and/or feature for which they require data. The frontend processing 3100 can initiate a call to the backend processing 3200 to get the relevant data (4). The data for the devices and features along with other data, such as topology data for example, needed by the frontend processing 3100 and the backend processing 3200 can be referred to as the network telemetry data or real-time network device 3300, as appropriate. The backend processing 3200 can make calls 3600 to the network device 3300 and associated cloud platforms to obtain the network telemetry data for the devices and features, as available (5). The network device 3300 can return the requested network telemetry data for the devices and features, as available.

The backend processing 3200 can create a response cache 3610 for the customer 3400 for the network telemetry data for the devices and features (6). In some implementations, the data can be saved in a format as shown in FIG. 4, for example. Other formats can be used without departing from the scope of the specification and claims. The backend processing 3200 can aggregate the network telemetry data received from the network device 3300 and send the aggregated network telemetry data to the frontend processing 3100 for display 3530 to the customer 2400 (7).

Based on the profile of the customer 3400, including previous login history, how long an average active session remains active and other information, the frontend processing 3100 and the backend processing 3200 (8) can initiate subscription processes or threads 3700, 3710, and 3720 for at least one or more of the device and feature (8.1, 8.2, ..., 8.n) (3620). Each of the subscription processes 3700, 3710, and 3720 can listen for real-time changes in the associated network telemetry data. When a subscription process, such as subscription process 3700, for example, identifies a data change, the changed network telemetry data can be pushed (9.1) to the backend processing 3200 (3620). The backend processing 3200 can update the changed data at the response cache 3610 (9). When the customer 3400 returns to a device and feature on the display 3530, the frontend processing 3100 can request the backend processing 3200 (10), in real-time, for any updates to the network telemetry data for the requested device and feature. The backend processing 3200 can obtain the network telemetry data including any updated network telemetry data from the response cache (11) 3610 so as to provide a real-time update to the frontend processing 3100 (10).

The subscription processes 3700, 3710, and 3720 can remain active as long as the session is active. Once the customer 2400 logs out of the management application 3500, the subscription processes 3700, 3710, and 3720 are terminated. In some implementations, the response cache 3610 can be versioned for statistical analysis, troubleshooting, machine learning, profile building, and other usages. For example, a service provider personnel can retrieve the versioned response cache to review the network telemetry data in the event the network device 3300 is malfunctioning.

In some implementations, the customer 2400 can maintain subscription processes for a selected device and feature after logging off. In this instance, real-time updates to the selected device and feature can be provided via a message, an email, or other communication platform. For example, this can be used for malware detection, violation of a parental control feature, security violation, and the like.

The pulling of data for all the devices and features, as and if available, occurs once upon establishment of each active session. Real-time updates can be provided as the customer 3400 switches between devices and features on the display 3530. Real-time updating is enabled using, for example, the response cache 3610 and the subscription processes 3700, 3710, and 3720. Backend processing 3200 and traffic with the network device 3300 is minimized since such activity occurs for data changes and not the pulling of all data, i.e., data for features not currently being viewed is not pulled or updated. This avoids network delay, improves system cost and performance, and makes the customer experience reliable.

Figure 6:
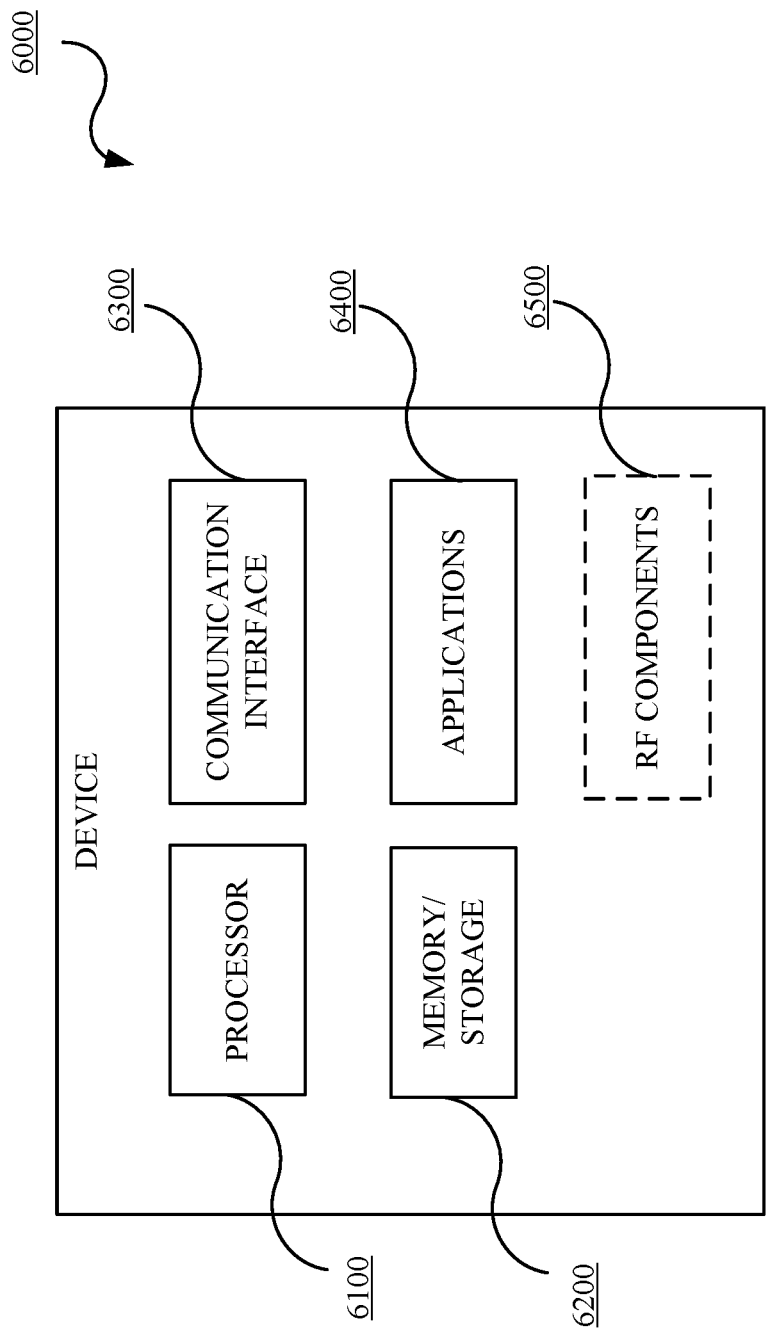
FIG. 6 is a block diagram of an example device in accordance with embodiments of this disclosure.
Figure 7:
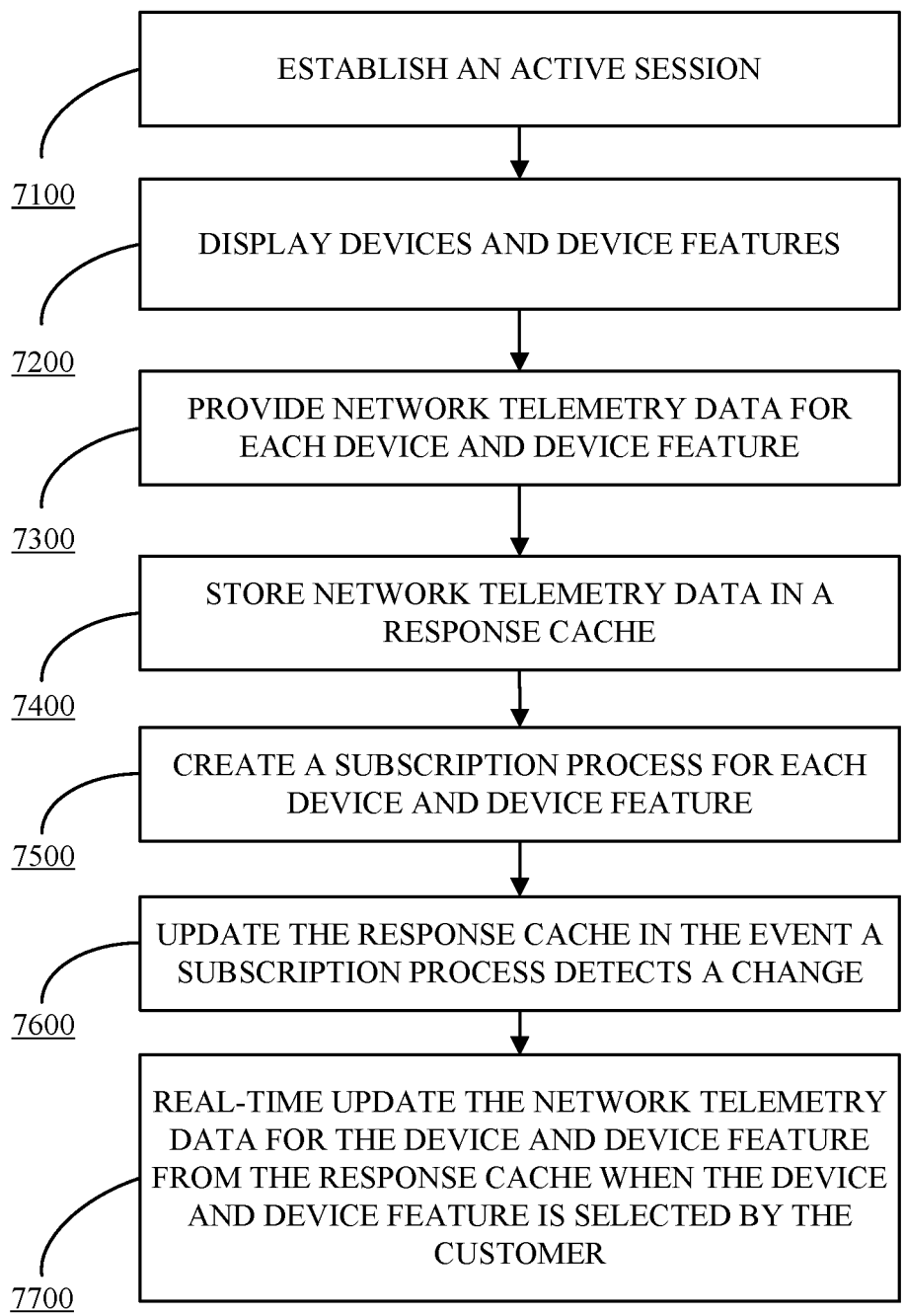
FIG. 7 is a flowchart of an example method of real-time network telemetry data reporting in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 10000 may include a RF component 6500 for wireless operation. The device 5000 or multiples thereof may include or implement, for example, the CPE 1100, the cloud platform 1200, the service provider system 1300, the device 1400, the devices $1500_1$ to $1500_N$, the service provider device 1600, and the device configuration manager 1700, for example. In an implementation, appropriate memory/storage 6200 may store the network telemetry data. In an implementation, appropriate memory/storage 6200 is encoded with instructions for management and telemetry. The instructions can further include programmed instructions for performing one or more of analysis via convolutional neural networks, deep learning analysis, and/or machine learning. The techniques or methods described herein may be stored in appropriate memory/storage 6200 and executed by the appropriate processor 6100 in cooperation with the memory/storage 6200, the communications interface 6300, the applications 6400, and the RF components 6500, as appropriate and applicable. The device 6000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein. FIG. 7 is a flowchart of an example technique and/or method 7000 for providing real-time network telemetry data in accordance with embodiments of this disclosure. The method 7000 includes: establishing 7100 an active session on a manager for a network device used by a customer; displaying 7200 devices and device features for each device associated with the network device; providing 7300 network telemetry data for each device and device feature; storing 7400 the network telemetry data for each device and device feature in a response cache; creating 7500 a subscription process for each device and device feature to listen for changes in network telemetry data for an associated device and device feature; updating 7600 the response cache in the event a subscription process detects a change in the network telemetry data for the associated device and device feature; and real-time updating 7700 the network telemetry data for the device and device feature from the response cache when the device and device feature is selected by the customer. The method 7000 can be implemented, for example, in the CPE 1100, the cloud platform 1200, the service provider system 1300, the device 1400, the devices 1500$_1$ to 1500$_N$, the service provider device 1600, the device configuration manager 1700, the device 6000, the processor 6100, the memory/storage 6200, the communication interface 6300, the applications 6400, and/or the RF components 6500, as appropriate and applicable.

The method 7000 includes establishing 7100 an active session on a manager for a network device used by a customer. A customer can manage and control the network device using the manager available as an application on a mobile device or at an online site. For example, the customer can control what devices can connect to the network device, at what time devices can access the network device, what policies and security are applicable for a device, and the like. The manager can be implemented, for example, using a client-server architecture.

The method 7000 includes displaying 7200 devices and device features for each device associated with the network device and providing 7300 network telemetry data for each device and device feature, as and if available. A customer profile can be used to determine which devices and device features associated with the network device are to be displayed. For example, devices which have used the Service Set Identifier (SSID) for the network device can be deemed associated with the network device. Other identifiers can be used. The client can request displaying the devices and device features. The client can request a server to pull network telemetry data, as and if available, for all displayed devices and device features from the network device. That is, a baseline is set for each displayed device and device feature based on the available network telemetry data. If no network telemetry data is available, a default value, an error indication, or other notification can be displayed.

The method 7000 includes storing 7400 the network telemetry data for each device and device feature in a response cache. The server can store the network telemetry data in the response cache.

The method 7000 includes creating 7500 a subscription process for each device and device feature to listen for changes in network telemetry data for an associated device and device feature. Based on the customer profile, the server can generate subscription process(es) for each device and device feature. For example, the customer profile can show that the customer will be active for at least one minute on average.

The method 7000 includes updating 7600 the response cache in the event a subscription process detects a change in the network telemetry data for the associated device and device feature. The subscription process will push changed data to the response cache.

The method 7000 includes real-time updating 7700 the network telemetry data for the device and device feature from the response cache when the device and device feature is selected by the customer. The client will request the server to obtain from the cache response updated network telemetry data for a device and device feature that will be or is about to be displayed to the customer. For example, as the customer switches between different device and device features, any changed network telemetry data will be updated in real-time from the response cache as opposed to having to pull the data from the network device.

In general, what is disclosed is a system for real-time network telemetry data. The system includes a response cache and a processor connected to the response cache. The processor is configured to pull, in response to a request from a management application on a customer device, network telemetry data from a network device for all features identified for a customer starting an active session on the management application, the management application associated with the network device, send the network telemetry data to the management application for display on the customer device, store the network telemetry data in the response cache, initiate a subscription process for each identified feature. Each subscription process is configured to listen for changes in network telemetry data for an associated identified feature and push detected changes in the network telemetry data for the associated identified feature to the response cache. The processor is configured to send, in response to a request from the management application for a customer selected identified feature, real-time updates to network telemetry data associated with the customer selected identified feature from the response cache to the management application.

In some implementations, the identified features are based on a profile of the customer. In some implementations, the identified features are based on a profile of the customer and customer selection. In some implementations, the processor is further configured to terminate subscription processes upon termination of the active session. In some implementations, the processor further configured to maintain certain of the subscription processes upon termination of the active session and terminate remaining subscription processes upon the termination of the active session. In some implementations, the processor is further configured to maintain certain of the subscription processes upon termination of the active session and send real-time updates for network telemetry data associated with the maintained subscription processes. In some implementations, the processor is further configured to keep active subscription processes for selected identified features upon closing of the active session and send, via a communication platform, real-time notifications of changes in network telemetry data associated with the active subscription processes. In some implementations, the processor is further configured to maintain versions of the response cache upon termination of the active session. In some implementations, the system further includes a service provider device configured to access the versions of the response cache for troubleshooting the network device.

In general, what is disclosed is a method for providing real-time router telemetry data. The method includes receiving, at a server from a router management client, a request to pull router telemetry data for selected features from a router in response an active session being initiated at the router management client, the router management client associated with the router, pulling, by the server from the router, the router telemetry data for all of the selected features, sending, by the server to the router management client, the router telemetry data for display on a customer device, storing, by the server to a database, the router telemetry data, establishing, by the server, a subscription process for each selected feature, wherein each subscription process listens for changes in router telemetry data for an associated selected feature, updating, by the subscription process at the database, a change detected in the router telemetry data for the associated selected feature, and sending, by the server to the router management client in response to a customer selected feature, real-time updates to router telemetry data associated with the customer selected feature from the database.

In some implementations, the selected features are based on a profile of the customer. In some implementations, machine learning techniques are used to populate the profile of the customer. In some implementations, the selected features are based on a profile of the customer and customer selection. In some implementations, the method further includes terminating, by the server, the subscription processes upon termination of the active session. In some implementations, the method further includes maintaining, by the server, certain of the subscription processes upon termination of the active session and terminating, by the server, remaining subscription processes upon the termination of the active session. In some implementations, the method further includes maintaining, by the server, certain of the subscription processes upon termination of the active session and sending, by the server, real-time updates for router telemetry data associated with the maintained subscription processes. In some implementations, the method further includes keeping active, by the server, subscription processes for designated features upon closing of the active session and sending, by the server via a communication platform, real-time notifications of changes in router telemetry data associated with the active subscription processes. In some implementations, the method further includes maintaining, by the server, versions of the database upon termination of the active session. In some implementations, the method further includes accessing, by a service provider device, the versions of the database for troubleshooting the router. In some implementations, the method further includes determining, by the server based on historical data and a profile of the customer, whether to initiate establishment of the subscription processes.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The one or more computer readable mediums can be non-transitory. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A system for real-time network telemetry data, comprising:
   a response cache; and
   a processor connected to the response cache, the processor configured to:
      pull, in response to a request from a management application on a customer device, network telemetry data from a network device for at least one feature identified for a customer starting an active session on the management application, the management application associated with the network device;
      send the network telemetry data to the management application for display on the customer device;
      store the network telemetry data in the response cache;
      initiate a subscription process for each identified feature, each subscription process configured to:
         listen for changes in network telemetry data for an associated identified feature; and
         push detected changes in the network telemetry data for the associated identified feature to the response cache; and
      send, in response to a request from the management application for a customer selected identified feature, real-time updates to the network telemetry data associated with the customer selected identified feature from the response cache to the management application, wherein the real-time updates includes the detected changes in the network telemetry data associated with the customer selected identified feature stored in the response cache in contrast to pulling the network telemetry data associated with the customer selected identified feature from the network device.

2. The system of claim 1, wherein the identified features are based on a profile of the customer as determined by the processor.

3. The system of claim 1, wherein the identified features are based on a profile of the customer as determined by the processor using historical data and customer selection.

4. The system of claim 1, wherein the processor is further configured to:
   terminate subscription processes upon termination of the active session.

5. The system of claim 1, wherein the processor is further configured to:
   maintain certain of the subscription processes upon termination of the active session; and
   terminate remaining subscription processes upon the termination of the active session.

6. The system of claim 1, wherein the processor is further configured to:
   maintain certain of the subscription processes upon termination of the active session; and
   send real-time updates for network telemetry data associated with the maintained subscription processes.

7. The system of claim 1, wherein the processor is further configured to:
   keep active subscription processes for selected identified features upon closing of the active session; and
   send, via a communication platform, real-time notifications of changes in network telemetry data associated with the active subscription processes.

8. The system of claim 1, wherein the processor is further configured to:
   maintain versions of the response cache upon termination of the active session.

9. The system of claim 8, further comprising:
   a service provider device configured to access the versions of the response cache for troubleshooting the network device.

10. A method for providing real-time router telemetry data, the method comprising:
   receiving, at a server from a router management client, a request to pull router telemetry data for at least one selected feature from a router in response an active session being initiated at the router management client, the router management client associated with the router;
   pulling, by the server from the router, the router telemetry data for the at least one selected feature;
   sending, by the server to the router management client, the router telemetry data for display on a customer device;
   storing, by the server to a database, the router telemetry data;
   establishing, by the server, a subscription process for each selected feature, wherein each subscription process listens for changes in router telemetry data for an associated selected feature;
   updating, by the subscription process at the database, a change detected in the router telemetry data for the associated selected feature; and sending, by the server to the router management client in response to a customer selected feature, real-time updates to router telemetry data associated with the customer selected feature from the database, wherein the real-time updates includes detected changes in the router telemetry data associated with the associated selected feature stored in the database in contrast to pulling the router telemetry data associated with the associated selected feature from the router.

11. The method of claim 10, wherein the selected features are based on a profile of the customer as determined by the processor.

12. The method of claim 11, wherein machine learning techniques are used to populate the profile of the customer.

13. The method of claim 10, wherein the selected features are based on a profile of the customer as determined by the processor using historical data and customer selection.

14. The method of claim 10, the method further comprising:

terminating, by the server, the subscription processes upon termination of the active session.

15. The method of claim 10, the method further comprising:

maintaining, by the server, certain of the subscription processes upon termination of the active session; and terminating, by the server, remaining subscription processes upon the termination of the active session.

16. The method of claim 10, the method further comprising:

maintaining, by the server, certain of the subscription processes upon termination of the active session; and sending, by the server, real-time updates for router telemetry data associated with the maintained subscription processes.

17. The method of claim 10, the method further comprising:

keeping active, by the server, subscription processes for designated features upon closing of the active session; and sending, by the server via a communication platform, real-time notifications of changes in router telemetry data associated with the active subscription processes.

18. The method of claim 10, the method further comprising:

maintaining, by the server, versions of the database upon termination of the active session.

19. The method of claim 18, the method further comprising:

accessing, by a service provider device, the versions of the database for troubleshooting the router.

20. The method of claim 10, the method further comprising:

determining, by the server based on historical data and a profile of the customer determined from historical data, whether to initiate establishment of the subscription processes.

\* \* \* \* \*